United States Patent [19]

Jackson et al.

[11] 4,395,456

[45] Jul. 26, 1983

[54] INORGANIC FOAM

[75] Inventors: Graham V. Jackson, Vicars Cross; Terence Goulding, Garswood; John A. A. Bradbury, Runcorn, all of England

[73] Assignee: Imperial Chemical Industries Limited, London, England

[21] Appl. No.: 222,683

[22] Filed: Jan. 5, 1981

[30] Foreign Application Priority Data

Jan. 10, 1980 [GB] United Kingdom ............... 8000881

[51] Int. Cl.$^3$ ..................... B32B 19/02; B32B 19/04; C04B 21/00
[52] U.S. Cl. ........................... 428/304.4; 106/75; 428/312.2; 428/312.6; 428/313.7; 428/317.9; 428/402; 501/85
[58] Field of Search ............... 428/310, 312.2, 312.6, 428/313.7, 304.4, 317.9, 402; 106/40 R, 75, 86; 501/85

[56] References Cited

U.S. PATENT DOCUMENTS

| | | | |
|---|---|---|---|
| 3,737,332 | 5/1973 | Sennett | 106/71 |
| 3,944,425 | 3/1976 | Magder | 501/84 |
| 4,130,687 | 12/1978 | Ballard | 428/310 |

FOREIGN PATENT DOCUMENTS

| | | |
|---|---|---|
| 986635 | 3/1965 | United Kingdom . |
| 1016385 | 1/1966 | United Kingdom . |
| 1076786 | 7/1967 | United Kingdom . |
| 1119305 | 7/1968 | United Kingdom . |
| 2214073 | 9/1973 | Fed. Rep. of Germany . |

*Primary Examiner*—Mark Bell
*Attorney, Agent, or Firm*—Cushman, Darby & Cushman

[57] ABSTRACT

A rigid inorganic foam of cellular structure comprising one or more layer minerals, and a method for making inorganic foams comprising gasifying a suspension of one or more layer minerals in a liquid medium, shaping the gasified suspension, and removing the liquid medium from the shaped gasified suspension.

38 Claims, No Drawings

INORGANIC FOAM

This invention relates to inorganic foams and in particular to rigid foams comprising a clay mineral. In particular the invention relates to inorganic foam materials comprising a plurality of foam prills derived from one or more layer minerals and a method for making such products; inorganic foam materials comprising certain layer minerals or a mixture of two or more layer minerals and a method for their production; uses of the inorganic foam products; and an intermediate product for use in the production of inorganic foam products.

The layer minerals are naturally-occurring forms of silica and are phyllosilicate materials, i.e. they have a layer-structure. Included within the term layer minerals are, for example, vermiculite, kaolinite and other clay minerals, montmorillonite, sepiolite, attapulgite, illite and saponite.

The clay minerals occur in clays as particles of the order of a few microns diameter which are aggregates or agglomerates of small crystalline units of the mineral of sub-micron size. Kaolin-type clay is essentially an aggregation of book-shaped units of sheets of the clay mineral kaolinite; it is to be understood that as used herein the term kaolinite includes kaolin-type clays, ball clays, fire clays and china clays in which kaolin minerals, occur in nature although such clays may not comprise pure kaolinite. Fire clays are a mixture of kaolinite and illite.

The layer minerals are well known and some at least are used extensively in industry. Kaolinite and kaolin-containing clays are used extensively in numerous industries, for example in the ceramics industries (the major usage) for the manufacture of white-ware, porcelain and refractories, and as a filler for paper, paints, adhesives, plastics and rubbers. Vermiculite is used, commonly in heat-exfoliated form (exfoliated vermiculite) as loose-file insulation material, in bound form as slabstock or boardstock for insulation and fire protection applications, and ion Agricultural Applications. Delaminated vermiculite, by which is meant vermiculite which has to be delaminated by chemical treatment followed by swelling in water and milling or grinding, has been proposed for use in making sheet-like materials or papers, as a coating material for substrates and for making rigid inorganic foam products for insulation and fire protection applications. Delaminated vermiculite foam and uses thereof are described, for example, in our U.S. Pat. No. 4,130,687. Montmorillonite is used extensively in industry as a filler for paper, adhesives and paints. Sepiolite is used extensively in the ceramics industry.

Rigid materials made from kaolinite, e.g whiteware, porcelain and refractories, are dense, brittle materials produced by processes involving a firing or sintering operation. Although kaolinite itself is a poor conductor of heat, the high-density rigid materials hitherto produced from it do not exhibit good insulation properties. Because of their high density (and hence heaviness), brittleness and unexceptional insulation properties, products made from kaolin-containing clays are not used to any significant extent in thermal-insulation or fire-protection applications. Rigid materials made from heat-exfoliated vermiculite tend to be dense (heavy), rather brittle materials and whilst they are used in industry for the fire-protection of structural steelwork they are not used extensively as insulation materials. Rigid foam materials made from delaminated (as opposed to heat exfoliated) vermiculite are lightweight and exhibit good fire protection and insulation properties, but are difficult to make in large sizes. Because such products tend to crack and deform extensively upon drying, they are difficult to produce in the form of slabstock or boardstock in sizes greater than about 30 cm square and 3 cm thickness.

In a first embodiment, the present invention resides in the discovery of a low-density product form of layer minerals which is both lightweight and exhibits good heat-insulation and fire protection properties, and is readily produced in the form of slabstock or boardstock of large sizes, for example up to 3 m×1 m×10 cm thickness.

According to a first embodiment of the invention there is provided a rigid inorganic foam product preferably having a density of less than 0.4 g/ml and more preferably less than 0.2 g/ml, comprising prills of one or more layer minerals, each prill being of cellular structure.

By the term "prills" as used throughout this specification we mean particles, beads, pieces or small lumps of foam having an essentially continuous cellular structure in which the walls of the cells are constituted by the layer mineral(s) particles, although the term is not intended as implying any particular size, shape or configuration of the pieces of foam. Typically, and as a guide only, the prills will be cylindrical or essentially spherical pieces of foam of maximum dimension below about 50 mm, for example from 0.5 to 5 mm.

As will be described more fully hereinafter, the inorganic foam products are made by assembling the prills of cellular structure into desired product forms such as slabstock or boardstock, such that the products have an essentially cellular structure although the true cellular structure may not be continuous throughout the product. It is to be understood that the term "rigid inorganic foam product" as used throughout this specification includes such products wherein the cellular structure is not truly continuous; thus for example the term includes products wherein the prills are bound together by means of an adhesive or by mutual attraction and voids exist between prills within the product structure.

The density of the foam products of the invention is normally below 0.25 g/ml, and may be as low as 0.06 g/ml for especially lightweight products. Typically, the products will have a density in the range of 0.08 g/ml to 0.15 g/ml.

By the term "rigid foam" as applied to the prills we mean a material having structural integrity which is a two-phase dispersion of gas in a solid matrix which is an essentially continuous cellular structure, and by the term "rigid inorganic foam" as applied to the prills we mean a rigid foam which is essentially made of inorganic material, though the presence of small amounts of organic materials as impurity in the layer mineral(s) or by deliberate addition (for example an organic surfactant used in production of the foam as described hereinafter) is not excluded. Moreover, by the term "rigid inorganic foam product" as applied to the products comprising an assembly of prills, we do not exclude the presence of a small amount, e.g up to 20% of an organic material present in the prills or added deliberately for example as a binder for uniting the prills into a self-supporting structure.

The embodiment of the invention described hereinbefore is a product of essentially cellular structure comprising prills of cellular structure made of one or more layer minerals. A further embodiment of the invention is a product of true cellular structure derived directly from a suspension of certain layer minerals or mixtures of layer minerals.

According to a second embodiment of the invention there is provided a rigid inorganic foam of cellular structure comprising a mixture of layer minerals and preferably having a density of less than 0.4 g/ml, more preferably less than 0.2 g/ml.

There is provided also a rigid inorganic foam of cellular structure comprising montmorillonite and preferably having a density of less than 0.4 g/ml, more preferably less than 0.2 g/ml.

There is provided in a further embodiment of the invention a rigid inorganic foam of cellular structure comprising sepiolite and preferably having a density of less than 0.4 g/ml, more preferably less than 0.2 g/ml.

There is also provided a rigid inorganic foam of cellular structure comprising a ball clay and/or a fire clay and preferably having a density of less than 0.4 g/ml, more preferably below 0.2 g/ml.

The foam product of the present invention, whether in the form of prills or as direct products, are made by a process involving incorporating a gas in a suspension (or dispersion) of a layer mineral in a liquid medium and a further feature of the invention resides in a process for the production of a rigid inorganic foam of cellular structure comprising one or more layer minerals which comprises gasification of a suspension of one or more layer minerals in a liquid medium containing a surface active agent to form a stable wet foam or froth and removal of at least part of the liquid medium from the froth.

By the term "stable wet foam or froth" we mean a gasified suspension which does not collapse upon standing or upon removal of liquid from it, and in particular which upon standing does not collapse (no substantial reduction in foam-height) within a period of 10 minutes. As is discussed in more detail hereinafter, the stability of the gasified suspension is dependent mainly upon the particular surface active agent used to form it and we have found that whilst some surface active agents, for example fatty amines and saponin, enable a froth to be produced the resulting froth is not stable and collapses within a few minutes; production of such an unstable gasified suspension is not included within the scope of the present invention.

As stated, the rigid foams are made by a process involving gasification of a suspension of one or more layer minerals and removal of the liquid medium from the resulting froth. In the case where the foam is produced in the form of prills, the gasified suspension or froth may be divided into droplets or wet particles before removal of the liquid medium. Division of the gasified suspension or froth into particles or wet droplets may be effected in a variety of ways, for example by spraying the froth through a nozzle or other orifice, extrusion of the froth through orifices in a belt or any other known technique for dividing suspensions into droplet or particle form. The wet particles or droplets should be at least partially dried before they have the opportunity to re-combine. Dry or partially dry prills may be produced using a spray-drying apparatus. Partially dry prills may be further dried by heating them under conditions whereby they are prevented from combining, for example in single layers or agitated beds such as a fluid bed. Prills may also be formed by shaping the froth into fibre-like lengths, drying it, and chopping the dry or partially dried material.

The density of the rigid foams (prills or directly extruded products) produced by the process of the invention may be varied in several different ways, for example by incorporating different amounts of gas into the suspension, by using blowing agents and by varying the solids content of the suspension. The solids content of the suspension affects the viscosity of the suspension, as also do the particular surface active agents used and the temperature at which gasification is effected, but in general increasing the solids content of the suspension results in an increase in the density of the foam produced from the suspension. Typically, the solids content of the suspension will be from 10% to 60% by weight of the suspension, preferably from 20% to 40% by weight. A deflocculating agent, for example sodium tripolyphosphate may be added to enable suspensions of high solids content to be produced.

The suspension of the layer mineral will usually be aqueous and in particular will be a suspension or dispersion of the layer mineral particles in water, preferably distilled or de-ionised water. Layer mineral are generally readily suspended or dispersed in water to form suspensions exhibiting colloidal properties. The liquid medium of the suspension may if desired be a mixture of water and a water-miscible solvent such as alcohol. If desired, however, the liquid may be an organic liquid. In converting the suspension into a froth and thereafter into a rigid foam, it is necessary to incorporate a surface active agent in the suspension and this agent will normally be added to the water prior to or during formation of the suspension. It is to be understood that in the case of the layer mineral vermiculite, delamination of the mineral may result in a surface active agent being incorporated in the delaminated material and a separate agent may not be required. In addition to a surface active agent, other agents such as fillers, compressive strength improvers, water-stability improvers and deflocculating agents may be incorporated in the suspension prior to, during or after production of the suspension.

Any surface active agent may be used which upon gasification of the suspension results in a wet foam or froth which is stable, by which is meant does not collapse upon standing for a period of at least 10 minutes or upon removal from it of the liquid medium. Anionic, non-ionic or cationic surface active agents may be used provided they result in a stable froth. The suitability of a surface active agent for use in the process is thus readily determined by simple experiment merely involving determination of whether the agent enables a wet foam or froth to be created from a suspension of say 30% solids content and if so whether the froth is stable. As a guide, a wet foam or froth which upon standing does not collapse (e.g. no substantial reduction in foam-height is observed) within a period of 10 minutes, preferably within a period of 1 hour, will in general be suitable for drying to yield a rigid foam according to the invention. For purposes of the test, the surface active agent under test may be used in any desired amount, or at various concentrations provided that it does not flocculate the foam; in general a large amount of the agent, for example 2% by weight of the solution, will provide an indication in an initial test as to whether the agent is worth further testing.

Surface active agents which can be used at low concentrations are preferred, though this is not critical. It has been observed that a surface active agent which provides a stable foam from a suspension of one layer mineral may not provide a foam of comparable stability from a suspension of another layer mineral or of mixed minerals such as a mixture of kaolinite and delaminated vermiculite. Equally, a surface active agent which fails to provide a stable foam from a suspension of one layer mineral may nevertheless provide a stable foam from a suspension of another layer mineral or of mixed minerals. For example the surface active agent n-butyl ammonium chloride does not yield a particularly stable foam from a suspension of kaolinite alone but does yield a stable foam from a suspension of delaminated vermiculite or of a 50:50 mixture by weight of kaolinite and delaminated vermiculite. This must be born in mind when testing the suitability of a surface active agent, i.e. the test should preferably be performed using the actual suspension it is desired to gasify and later dry to a rigid foam.

In respect of the surface active agent it has been observed also that those surface active agents which most readily produce a foam or froth do not necessarily produce the most stable froth. In fact we have found that, in general, surface active agents which produce a froth only with some difficulty (e.g. after prolonged whisking of the suspension) tend to produce the more stable froths. The ease with which a surface active agent enables a froth to be created is not, however, conclusive evidence as to the suitability of that agent for use in the process of the present invention and it is to be understood that the invention is not limited to agents of low foaming characteristics.

The amount used of the surface active agent may vary within wide limits, depending for example upon the solids content of the suspension, the particular layer mineral and surface active agent, the particular gasification technique employed and the temperature of gasification. As a guide the amount of surface active agent will typically be from 0.1% to 5% by weight based on the weight of the layer mineral in the suspension to be gasified. Since the surface active agent remains in the rigid foam upon removal of liquid from the froth and its presence in the rigid foam is undesirable, we prefer to use the minimum possible amount of surface active agent consistent with production of a stable froth which does not collapse upon removal of liquid from it.

Gasification of the suspension may be effected in a variety of ways, for example by release of gas or vapour in the suspension or by mechanically entraining a gas in the suspension by rapid agitation of the suspension. The gas will normally be one which is inert to the (aqueous) suspension for example air, nitrogen, carbon dioxide, a hydrocarbon or a chlorofluorocarbon. Mechanical entrainment of the gas in the suspension can be achieved, for example, by rapid churning, beating or whisking of the suspension.

Release of gas or vapour in the suspension can be achieved by heating the suspension, preferably rapidly, to release bubbles of the gasified liquid medium (steam where the liquid medium is aqueous) or to release bubbles of the vapour of a substance (blowing agent) deliberately incorporated in the suspension as a source of vapour for gasification of the foam. The blowing agent may be, for example, a hydrocarbon, chlorocarbon, a fluorocarbon, a chlorofluorocarbon or a source of carbon dioxide. The suspension can be gasified by subjecting it to electromagnetic radiation having a frequency in the range of from $10^4$ Hz to $10^{12}$ Hz.

Production of the suspension, and gasification of the suspension in the cases where gasification does not involve a heating step, conveniently can be carried out at room temperature, though higher or lower temperatures may be employed if desired.

The removal of the liquid medium from the gasified suspension will normally be mainly by evaporation usually induced by heating the gasified suspension. The rate of removal of liquid from the froth can be controlled, for example by controlling the temperature of the froth or by use of a drying vessel having provision for humidity control, such that too rapid drying of the foam leading to cracking or bowing of the foam is avoided. If desired the wet foam may be allowed to stand at room temperature for a prolonged period, for example several days, to allow the foam to dry out and attain a rigid structure. Normally, however, the froth will be heated, after shaping, at temperatures up to about 90° C. to remove the liquid medium. Control of the drying conditions may be important in the production of products such as slabstock or boardstock directly by extrusion of the gasified suspension and drying, but is less important in the production of prills where rapid drying is possible for example at temperatures up to 200° C. or even higher.

Rigid inorganic foams comprising layer minerals tend to be soft and of low compressive strength. Depending upon the particular layer mineral, the strength of the foams can be improved by incorporating therein a compressive strength improver and/or by heating the dry foam to sinter it. Incorporation in mixed-mineral foam, e.g. by incorporation in the suspension prior to gasification, of vermiculite lamellae (delaminated vermiculite) results in general in an increase in the compressive strength of the foam. Except in the case of wholly vermiculite foams, strong foams are obtained by sintering the dry, rigid foam obtained by drying the gasified suspension, for example by heating the dry foam at a temperature of up to 1000° C. or even higher. Sintering of the foam may result in densification of the foam but the sintered foam retains a cellular structure and remains a lightweight material. Sintering of mixed vermiculite/other mineral foams may result in an increase or a decrease or very little change in the density of the foams, depending upon the proportion of vermiculite in the foam and the weight of material lost upon heating the foam at sintering temperatures.

Sintered layer mineral foams are included within the scope of the present invention, as is their process of production.

Unsintered rigid foams comprising layer minerals exhibit little resistance to degradation by liquid water and we prefer to subject the foams to a treatment to improve their water stability. For instance, the foams can be water-proofed by incorporating a silicone polymer precursor therein and subsequently creating within the foam acidic conditions under which polymerisation of the precursor occurs with the formation of a silicone polymer in the foam. For example, sodium methyl siliconate can be incorporated in an aqueous suspension of kaolinite prior to or during gasification of the suspension and the resulting foam whilst still wet can be treated with an acidic gas such as carbon dioxide gas to create the acid conditions necessary for polymerisation of the siliconate to yield a silicone polymer. Instead of treating the foam with an acidic gas during the drying of the rigid foam in the foam-making process, the foam may be fully dried and then subsequently wetted out with water to the desired extent. If desired, instead of a deliberate treatment with an acidic gas, the wet foam may be allowed to stand in air for a prolonged period whereupon carbon dioxide in the air will be absorbed to provide the necessary acidic conditions in the foam. Sintered foams, where a silicone polymer incorporated before sintering would be destroyed, can be water proofed with a silicone polymer after sintering.

The relative proportions of the layer minerals in suspension of mixed minerals, and hence in the resulting rigid foam, may vary within wide limits, depending for example upon the compressive strength and thermal insulation properties required in the rigid foam. The foams may comprise, for example kaolinite or a kaolin-containing clay and vermiculite in the relative proportions of from 90:10 to 10:90 by weight. In general, increasing the relative proportion of vermiculite lamallae in the rigid foam results in an increase in the compressive strength of the rigid foam but also an increase in the thermal insulation coefficient (K-value) of the rigid foam.

Rigid foams of cellular structure comprising lamallae of vermiculite and their production by gasification of a suspension of vermiculite lamellae to form a froth, extrusion of the froth and removal of the liquid medium from the froth are described in co-pending U.K. Patent Application No. 14764/76 and the corresponding U.S. Pat. No. 4,130,687 in which the production of suspensions of vermiculite lamallae is also described. The disclosures in the co-pending application are incorporated herein by reference.

The rigid mixed-mineral foams of the present invention containing delaminated vermiculite are conveniently derived from a suspension of vermiculite lamallae by incorporating another layer mineral in the suspension prior to gasification thereof. As is described in U.S. Pat. No. 4,130,687, the suspension of vermiculite lamallae will usually contain a surface active agent such as n-butyl ammonium chloride used in production of the suspension so that incorporation of another layer mineral in the suspension provides both the suspension and the surface active agent necessary for the production of rigid foams as described herein.

Preferably mixed mineral foams containing vermiculite contain an agent for improving the compressive strength and water stability of rigid foams comprising only vermiculite lamellae. The enhancement of the compressive strength and water stability of vermiculite foams by incorporation of a compressive strength improver which is a solid particulate material having a basic reaction in water is described in co-pending U.K. Patent Application No. 33723/78 and corresponding European Application No. 79301577.7, the disclosure of which is incorporated herein by reference. As is described in the co-pending application, the preferred compressive strength and water stability improver is particulate magnesium oxide, and we prefer to incorporate particulate magnesium oxide in the mixed-mineral (containing vermiculite) foams of the present invention. As described hereinbefore, the compressive strength of the mixed mineral foams can alternatively be enhanced by sintering the foam.

The suspensions containing a surface active agent used to form the rigid mixed layer mineral foams of the invention are provided according to a still further feature of the present invention, including the following suspensions of mixed layer minerals:

(i) a suspension in a liquid medium containing a surface active agent of vermiculite lamellae and one or more other layer mineral.

(ii) a suspension in a liquid medium containing a surface active agent of vermiculite lamellae, one or more other layer minerals and a compressive strength and water stability improver, e.g. magnesium oxide, (iii) a suspension as (i) or (ii) above additionally containing a deflocculating agent, for example a tripolyphosphate, and (iv) a suspension in a liquid medium containing a surface active agent of two or more layer minerals.

Preferably the liquid medium in each of the suspensions is aqueous and in particular is water. Preferably, also, in each of the suspensions of mixed layer minerals, one of the layer minerals is kaolinite.

Each of the above suspensions (i) to (iv) can be dried as also can similar suspensions free fromm surface active agents, for example by spray-drying, to yield a corresponding free-flowing, dry-powder material and such materials are also provided according to the invention. These dry-powder materials are readily re-dispersed in a liquid medium, particularly water, to form a suspension suitable for conversion into a rigid foam by the process described herein. In the case of dry-powder materials containing magnesium oxide, it is preferred to dry a suspension free from magnesium oxide and to add dry magnesium oxide to the dried suspension. It will be appreciated that the dry powders according to the invention may also be produced by mixing dry-powder comprising vermiculite lamellae with another powdered layer mineral (optionally mixed with sodium tripolyphosphate) and optionally with dry, powdered magnesium oxide.

The rigid foam products provided by the invention, whether made wholly of one layer mineral or comprising mixed minerals, for example kaolinite and vermiculite, are heat-resistant and heat-insulating materials which are useful in a wide variety of fire-protection and thermal insulation applications. The products may be produced as slab stock or board stock for use in subsequent fabrication processes, for example for formation of laminates with sheets of a wide variety of materials such as wood, veneers, asbestos, mica, plastics, vermiculite board (foamed or made from heat-exfoliated vermiculite granules), glass fibre scrim impregnated with vermiculite and polymers. Such laminates from useful decorative construction panels for the building industry. Slab stock may be used directly, without lamination to another material, for example for cladding wood, cement or steel construction elements to provide a fire-protection barrier and heat-insulation layer around the elements, and as roofing boards, lining boards and ceiling tiles.

The rigid foams may be subjected to high temperatures, for example up to 1000° C. for prolonged periods without disintegration although prolonged exposure to high temperatures results in embrittlement of the products. Press-moulding of the surface of the rigid foams after or during drying thereof produces a smooth surface which may be sculptured for decorative effect if desired.

The rigid foams, if desired in the form of a laminate with another material, may be used in fire-doors or fire-barrier partitions. In the form of prills they may be used as loose-filling for cavities, voids and the like.

The prills of foam may be glued together to foam the desired products. A variety of inorganic and organic (but preferably inorganic) adhesives may be used to glue the prills together to make slab stock to form laminates from the rigid foam or to apply slab stock as a coating or cladding to substrates such as wood, cement and steel construction elements. Slab stock of thickness up to 10 cm or more can be produced by cementing together prills of dry foam. Examples of inorganic binders which may be used are phosphoric acid, aqueous solutions of phosphates and silicates cements and plasters. Examples of organic binders which may be used are aqueous emulsions of vinyl and vinylidene polymers and copolymers.

Prills of the foams, especially those comprising wholly or partially delaminated vermiculite (vermiculite lamellae) can be dry-pressed into products having structural integrity without the need to employ an adhesive or binder. Preferably products obtained by dry-pressing prills are in the form of laminates wherein the prill product is faced with or sandwiched between layers, for example of paper or sheet. Whilst products may be formed by dry-pressing the prills we prefer to moisten or dampen the prills before pressing them into products.

The web foam (i.e. the gasified suspension) and the suspension prior to gasification may be used as a binder in cementing together rigid foam prills. For use as an adhesive, we prefer that the wet foam or suspension should comprise or contain vermiculite lamellae and preferably an appreciable proportion of vermiculite lamellale, for example at least 50% by weight of the total solids content of the wet foam or suspension.

According to one embodiment of the invention for making prill products, there is provided a process for the production of shaped articles from prills of rigid inorganic foam comprising one or more layer minerals, which process comprises applying a solution containing phosphate ions or silicate ions to the prills and drying the resulting wet prills whilst they are retained in the desired shape.

The solution containing phosphate ions may be a phosphoric acid or a solution of a phosphate salt. Organic and inorganic phosphates may be used, including complex phosphates, although since the shaped article produced by the process is desirably wholly or at least essentially inorganic we prefer to use inorganic phosphates or a phosphoric acid. The preferred solution containing phosphate ions is orthophosphoric acid. Sodium silicate solution is the preferred solution containing silicate ions.

In carrying out the process of the invention, prills of foam are assembled into the shape of the desired product, for example a slab or board, and whilst in this shape are dried in the presence of a solution containing phosphate or silicate ions such that after drying the prills are glued together and the shaped article formed from them has structural integrity. The solution may be applied to the individual prills before the latter are assembled into the desired shape or the solution may be applied to the assembled prills whilst they are retained in the desired configuration to produce a shaped article. Alternatively the solution may be applied to the prills, before or after assembly of the prills into the desired shape, by creating on the prills a dry coating of a phosphoric acid, phosphate salt or silicate and subsequently wetting the coated prills to create the solution containing phosphate or silicate ions.

It is preferred to apply the solution to the individual prills prior to assembling the prills into the desired shape. It is especially preferred to produce prills having thereon a dry coating of a phosphoric acid, phosphate salt or silicate and which are readily stored and transported, and which simply require wetting by a fabricator of shaped articles before or after assembly of the prills into the desired shaped articles. It is usually more convenient in practice to wet the individual prills prior to assembly into desired shapes than to wet the prills after assembly, and it is also easier in this way to control the amount of solution applied to the individual prills and to ensure a uniform concentration of the solution throughout an assembly of the prills.

Prills of a layer mineral foam having thereon a dry coating of a phosphoric acid, a phosphate salt or a silicate are provided according to a preferred feature of the invention. Such coated prills are readily prepared by applying a phosphoric acid or a solution of a phosphate salt or silicate to the prills and drying them by evaporation of the liquid medium from the coating under conditions whereby gluing together of the prills is avoided; re-wetting of the dry, coated prills recreates the solution containing phosphate or silicate ions on the prills. Drying of the prills may be, for example, by fluid-bed drying.

The amount of the solution containing phosphate or silicate ions and the concentration of ions in the solution applied to the prills may vary within wide limits but affect the physical properties of shaped articles formed from the prills. In particular the amount of solution applied and the concentration of the solution affects the density of the shaped products; in general increasing the amount of a particular solution applied to the prills will result in an increase in the density of shaped products made from the prills and likewise increasing the concentration of ions in the solution will result in an increase in the density of shaped products made from the prills.

Another physical property of the products which may be affected by the amount and concentration of the solution applied to the prills, at least in the case of phosphate solutions, the strength of the products. We have observed that as the amount of phosphate ions (at least the amount in the surface region of the prills) increases there exists a peak in the strength of the product formed from the prills and that increasing the amount beyond that which provides the peak, either by increasing the amount of solution applied or the concentration of the solution, tends to result in a decrease in the strength of the products.

The amount of solution applied to the prills may depend to some extent upon the method by which the solution is applied, but for a particular application technique the optimum combination of amount of solution applied and solution concentration is readily determined by simple trial and experiment. Application of the solution to the prills may be by any convenient technique, for example immersion, brushing or roller coating, but by far the preferred application technique is spraying. Spraying has the advantage of most readily enabling control to be exercised over the amount of solution applied to the prills and in particular enables the prills to be surface coated with minimum impregnation of the prill structure by the solution. Layer mineral foam prills are generally highly porous structures which readily absorb liquids and unless steps are taken to avoid it any solution applied to the prills will rapidly penetrate the structure to the interior of the prills. This is undesirable in the present invention from the standpoints of the density of products made from the prills and the thermal conductivity properties of such products. A spraying technique operated in a controlled manner to apply the minimum amount of solution necessary to surface-coat the prills is therefore preferred.

In addition to applying the minimum amount of solution required to surface-coat the prills, we prefer to employ fairly dilute solutions of the phosphoric acid or phosphate or silicate salt so as to again restrict the amount of phosphoric acid, phosphate or silicate applied to the prills. As a guide we prefer to employ solutions of concentration from 5% to 20% by weight, especially solutions of concentration from 7% to 15% by weight. In the embodiment of the invention in which dry, coated prills are wetted out with water for formation into products, the amount of water added will normally be about 60–70% by weight of the prills.

The wet prills, either as individual prills or assembled into shaped products, may be allowed to dry at ambient (room) temperature but usually will be heated to increase the rate of drying. The temperature employed is not critical and may be up to several hundred °C. if desired. In general the wet prills will be heated at about the boiling point of the liquid to be removed when drying shaped products made of the wet prills, for example at about 90° C. to 110° C. where the liquid is water, but for drying individual prills there may be an advantage in employing higher temperatures, for example up to 600° C. The physical properties of the dry coated prills, and dry shaped products made from them does not appear to be dependent upon the temperature used to dry the coated prills or the shaped products.

The process may be produced by gasifying a suspension of vermiculite lamellae to form a froth and removing the liquid from the froth under conditions such that the rigid foam obtained is in the form of prills or a product form which can be converted to prills. An example of a suitable product form for conversion into prills by chopping e.g. using a gas jet is a fibre-like extrusion of froth which may be chopped into prills before drying or dried and then chopped into prills. A wide variety of direct prill-forming techniques may be employed, for example spray-drying, belt-extrusion in which the froth is caused to pass through holes in a belt to form The chemical delamination of vermiculite to produce suspensions, usually aqueous suspensions, of vermiculite lamellae suitable for conversion into rigid vermiculite-form prills is known; delamination processes are described for example in United Kingdom Patent Specifications Nos. 1,016,385; 1,076,786; and 1,119,305; and by Baumeister and Hahn in "Micron" 7,247 (1976). Prills of foam made from the suspensions produced by any of the known processes may be employed in the present invention.

For use in the preparation of foam prills it is preferred to employ suspensions of vermiculite lamellae which have been wet-classified to remove all particles of size greater than 50 microns, preferably 20 microns and which contain a high proportion, for example 40% to 60% by weight, of lamellae of size below 5 microns.

The strength of the shaped products of the invention and particularly their flexural strength can be improved by laminating the layer of bonded prills with a surface layer of a flexible sheet material such as paper (e.g. Kraft paper or vermiculite paper or glass fibre scrim impregnated with vermiculite) or metal strip or foil. Such a facing layer or facing layers may be applied by conventional laminating techniques to pre-formed foam articles but for convenience the facing layer(s) is applied during production of the foam article. Thus, for example, slabs or boards can be produced by laying wet phosphate or silicate-coated prills down between layers of a facing material, slightly compressing the assembly, and drying the prills to form a laminate of foam core with integral facing layers.

Slab stock (or board stock) comprising rigid foam prills bound in a cellular matrix are another feature of the present invention, including the following materials:

(i) Prills of foam made of one layer mineral in a cellular matrix comprising the same or another layer mineral, (ii) Mixtures of foam prills of different layer minerals in a cellular matrix comprising one or more layer minerals, (iii) Prills of kaolinite foam in a cellular matrix comprising vermiculite, (iv) Prills of vermiculite foam in a cellular matrix comprising vermiculite or kaolinite, or both (v) Prills of kaolinite foam in a cellular matrix comprising kaolinite, and (vi) Prills of kaolinite/vermiculite foam in a cellular matrix comprising vermiculite or kaolinite or a mixture of kaolinite and vermiculite.

Production of products having prills of foam embedded in a cellular matrix involves incorporating pre-formed prills into a gasified suspension or froth of a layer mineral and drying the resulting prill-filled froth. The prills can be incorporated in the froth by gently stirring them into the froth and the filled froth may be shaped e.g. by extrusion into the desired product form and dried. Alternatively the prills may be assembled into the desired shape in, say, a mould, and the froth may be forced into the assembled prills by the application of pressure or drawn into the prills by the application of suction, e.g. in a vacuum-forming technique. The pressing of prills into a pre-formed layer of froth to form boards or slab stock is also possible, though in general such a technique tends to result in collapse of the prills and/or the froth, leading to a denser product than is obtainable by other techniques. The amount of froth used may vary within wide limits but will usually be just sufficient to completely fill the voids between the packed prills, for example about an equal weight of froth after drying based on the weight of the prills.

Another form of slab stock according to the invention comprises heat-exfoliated granules of vermiculite in a prill matrix or in a cellular matrix comprising kaolinite or a mixture of kaolinite and vermiculite.

The invention is illustrated by the following Examples.

EXAMPLE 1

A mixture of kaolin clay (60 g), de-ionised water (240 ml) and "Forafac" 1157 foaming agent (0.2% by weight of the kaolin) was beaten for 40 minutes in a Kenwood Chef food mixer. The Forafac foaming agent is a fluorochemical surface active agent containing a $C_7F_{15}$-group and an amphoteric group and is available from Ugine Kuhlmann Company. A wet foam or froth was produced of wet density 240 kg/m$^3$.

The wet foam was laid down in a mould and allowed to stand for 24 hours, after which time it was heated at about 60° C. in an air oven to dry it. The density of the resulting dry rigid foam was 75 kg/m$^3$. Linear shrinkage of the foam during the oven drying step was observed to be 9%.

EXAMPLE 2

A dry, rigid foam produced as described in Example 1 was placed in a furnace at 600° C. and the temperature was raised to 1150° C. After 30 minutes at 1150° C. the foam was removed and was found to be a sintered foam of density 90 kg/m$^3$ and having a compressive strength of 200 KN/m$^2$ at 20% compression.

EXAMPLE 3

A mixture of kaolin (60 g), de-ionised water (240 ml) and "Empigen" BB foaming agent (0.45% by weight of the kaolin) was beaten in a Kenwood food mixer for 30 minutes. The foaming agent is available from Albright and Wilson and is an amphoteric hydrocarbon surfactant having carboxylic groups. A wet foam or froth was produced of density 195 kg/m$^3$. After standing for 24 hours and drying at 60° C. as described in Example 1, the froth yielded a dry, rigid foam of density 63 kg/m$^3$.

EXAMPLE 4

A mixture of kaolin (100 g), de-ionised water (200 ml), sodium tripolyphosphate (0.1 g) deflocculating agent and 'Forafac' 1157 foaming agent (0.1% by weight of the kaolin) was beaten in a Kenwood food mixer for 10 minutes, after which time a stable wet foam or froth has been produced. The froth was dried as described in Example 1 to yield a dry, rigid foam of density 200 kg/m$^3$.

EXAMPLE 5

A suspension (152 g) of delaminated vermiculite (vermiculite lamellae) in de-ionised water (21.9% solids content) was mixed with de-ionised water (125 g) in a Kenwood food mixer using the wire attachment. Sodium tripolyphosphate deflocculating agent (0.5 g) and kaolin (33.3 g of light grade kaolin available from BDH Chemicals) were added and mixed into the suspension. The mixture was whisked at maximum speed for about 10 minutes until the resulting froth had attained maximum height, whereupon the mixing speed was reduced and magnesium oxide (37 g of light grade available from BDH Chemicals) was added to and mixed into the froth. The mixing speed was again increased to maximum for about 1 minute.

The resulting stable wet foam, or froth, was spread in a polyethylene-film lined aluminium tray of dimensions 15 cm × 15 cm × 2.5 cm. The froth was allowed to stand at room temperature for about 12 hours and was then dried at 80° C. in an air oven. The dry, rigid foam had a density of 150 kg/m$^3$ and its compressive strength was 445 KN/m$^2$ at 20% compression.

EXAMPLE 6

A dry rigid foam was produced as described in Example 5 except that 70 g of de-ionised water were used instead of 100 g. The dry rigid foam produced had a density of 202 kg/m$^3$ and its compressive strength was 800 KN/m$^2$ at 20% compression.

EXAMPLE 7

A dry, rigid foam was produced as described in Example 5 except that 67 g of kaolin were used instead of 33.3 g. The dry, rigid foam had a density of 215 kg/m$^3$ and its compressive strength at 20% compression was 640 KN/m$^2$.

EXAMPLE 8

A dry, rigid foam was produced as described in Example 5 except that 100 g of kaolin were used instead of 33.3 g. The density of the dry, rigid foam was 302 kg/m$^3$ and its compressive strength was 587 KN/m$^2$ (20% compression).

EXAMPLE 9

A dry, rigid foam was produced as described in Example 5 except that the weight of kaolin was 133.3 g instead of 33.3 g. The foam had a density of 375 kg/m$^3$ and its compressive strength (20% compression) was 943 KN/m$^2$.

EXAMPLES 10 TO 12

In these examples the vermiculite prills employed were made by the following general procedure:

Prill-Formation

An aqueous suspension of vermiculite lamellae obtained by swelling vermiculite using consecutive treatments with refluxing salt solution, refluxing n-butylammonium chloride solution and water was milled and wet-classified by removal of all particles greater than 50 microns. The suspension was gasified by heating in an Oakes Mixer or Kenwood Food Mixer to form a froth and magnesium oxide powder (10% by weight based on the vermiculite) was incorporated during the gasification operation.

The wet froth was cast immediately onto a perforated 'Melinex' belt, the froth passing through the holes in the belt and forming 'beads' on the underside of the belt. The beads were allowed to cure and partially dry for a few minutes before being dislodged from the belt by scraping. The beads were then oven-dried on trays to provide prills of dry, rigid foam for fabrication into products. By varying the concentration of vermiculite in the suspension employed, prills of foam of various density were obtained. The prills were of roughly cylindrical shape and of average dimensions 2–3 mm diameter and 3–5 mm length. They had a uniform cellular structure.

EXAMPLE 10

Vermiculite foam prills (20 g) of density 112 kg/m$^3$ were stirred carefully with an aqueous solution (66.5 g) of concentrated phosphoric acid (5 g) in de-ionised water. The thus-moistened prills were spread on a flat drying tray and oven-dried at 60° C. for 16 hours. Any agglomerates of the prills were broken up by hand and any fine dust was removed by sieving.

Dry, phosphate-coated prills (8 g) were mixed thoroughly with deionised water (16 g) and the moistened prills were lightly compacted into two cylindrical tubes lined with 'Melinex' plastic of diameter 4.35 cm and height 2.0 cm using a knife spatula. The flat top and bottom surfaces of the prill assembly were skimmed with the spatula to produce a smooth finish and the tubes were heated in an oven at 150° C. for 4 hours.

The tubes were removed from the oven and the foam cylinders were removed from the tubes and immediately their compressive strengths (10% compression) were determined using a Houndsfield Tensometer. The article had a 20% by weight loading of phosphate binding agent and its density (mean of the two samples) was 206 kg/m$^3$ and compressive strength 274.8 KN/m$^2$.

EXAMPLE 11

Articles were made as described in Example 1 except that they had a 10% by weight loading of the phosphate binding agent instead of a 20% loading; this 10% loading was achieved by mixing 20 g of the foam prills with a solution (62.5 g) of concentrated orthophosphoric acid (2.22 g) in deionised water.

The article had a density (mean of the two samples) of 154 kg/m$^3$ and a compressive strength of 126.4 KN/m$^2$.

EXAMPLE 12

Vermiculite foam prills (50 g) of density 104 kg/m$^3$ were coated with orthophosphoric acid using a laboratory-scale fluid bed drier, (Model FBD/L72 by PR Engineering Ltd). To coat the prills they were placed in a fluidised cylindrical bed of height 30 cm and diameter 13 cm held in the head of the fluid bed drier and were heated at 140° C. 2.5 m orthophosphoric acid (12 ml) was sprayed onto the fluidised prills using a "Delavan" air atomizing syphon nozzle (model 30610-1) at a delivery rate of 0.22 cm$^3$/second. A prill loading of 2.5% by weight orthophosphoric acid was thus achieved.

The dry, coated prills (8 g) were formed into cylindrical articles and tested as is described in Example 1. The finished articles had a density (average for the two samples) of 127 Kg/m$^3$ and a compressive strength of 386 KN/m$^2$.

EXAMPLES 13–15

Dry, rigid ball clay foams were produced by the method generally described in Example 1 from the following ball clay suspensions.

| Example | Ball Clay (g) | Water (cm$^3$) | Forafac (g) | Beating time (mins) |
|---|---|---|---|---|
| 13 | "Hymod"/AT(100) | 200 | 2 | 20 |
| 14 | BSK/L(371) | 200 | 2.4 | 20 |
| 15 | "Hycast"/VC(100) | 200 | 2 | 20 |

The wet foams were converted into day, rigid foams as described in Example 1 and the dry foams were sintered at 1050° C. as in Example 2. The properties of the wet and dry foams were determined and are shown below.

| PROPERTY | 13 | 14 | 15 |
|---|---|---|---|
| Wet density (Kg/m$^3$) | 245 | 198 | 196 |
| Dry density (Kg/m$^3$) | 124 | 99 | 98 |
| Sintering time (mins) | 5 | 5 | 5 |
| Sintered density (Kg/m$^3$) | 128 | 101 | 99 |
| *CS sintered foam (KN/m$^2$) | 700 | 114 | 172 |
| *CS at 100 Kg/m$^3$ | 420 | 114 | 150 |
| *CS at 200 Kg/m$^3$ | 1340 | — | 630 |
| *CS unsintered foam | 40 | — | 10.8 |

*C.S. = Compressive Strength in KN/m$^2$
CS at 100 Kg/M$^3$ and 200 Kg/m$^3$ are respectively the Compressive Strengths of foams of density 100 Kg/m$^3$ and 200 Kg/m$^3$.

In a further series of experiments, the wet foams produced in Examples 13, 14 and 15 were converted into dry, rigid-foam prills by the belt-extrusion technique described for making vermiculite foam prills in Examples 10–12. In each case, handleable prills of cellular structure were obtained.

In a still further series of experiments, the wet foams were made into prills of cellular structure in a spray-drying apparatus.

The prills from all six experiments were sintered at 1050° C. and in each case the cellular structure of the prill was retained.

EXAMPLE 16

A fire clay (kaolinite/illite) slip was passed through a 20 micron sieve to remove any large particles of quartz and 201 g of the sieved slip (47% by weight solids) was mixed with 128 g of de-ionised water and 2.4 g of "Forafac" 1157 (0.63%) by weight based on the clay). The resulting slurry (30% solids) was whisked in a Kenwood Chef Food Mixer for about 20 minutes to form a stable wet foam.

Samples of the wet foam were converted into an extruded dry, rigid foam by the procedure of Example 1 and the foam was sintered at 1150° C. as in Example 2. The wet foam had a density of 190 Kg/m$^3$ and the sintered foam had a density of 116 Kg/m$^3$ and a Compressive Strength of 70 KN/m$^2$ (at 10% compression).

EXAMPLE 17

7.04 Kg of ball clay EWVA, 12.9 Kg of de-ionised water and 169 ml of "Forafac" 1157 (0.6% on the clay) were mixed to form a slurry of 35% solids content. The slurry was whisked in a Kenwood Chef Food mixer for 20 minutes and the resulting stable wet foam was converted into prills of foam in a conventional spray-drying apparatus. The resulting prills were sintered at 1150° C. for 5 minutes. The wet foam had a density of 256 Kg/m$^3$ and the sintered prills had a density of 150 Kg/m$^3$.

EXAMPLE 18

Sepiolite (38 g) was mixed with de-ionised water (162 g) and "Forafac" 1157 (0.06 g—0.4% on the clay) in a Kenwood Chef Food Mixer for 15 minutes to form a stable wet foam. The wet foam, of density 195 Kg/m$^3$, was converted into prills of cellular structure by the belt-extrusion technique described in Examples 10–12. The prills were sintered at 1050° C. for 5 minutes and the sintered prills had a density of 58 Kg/m$^3$.

EXAMPLE 19

18.9% delaminated vermiculite slurry in de-ionised water (116 g) was mixed with de-ionised water (78 g) and sodium tripolyphosphate (0.5 g). Light Grade Kaolin clay, ex BDH (67 g) was added to the mixture which was then whisked in a Kenwood Chef mixed for about 15 minutes. Light Grade Magnesium oxide powder, ex BDH (3.7 g) was added and the mixture was whisked to dispense the powder. The wet foam was made into prills by the belt-extrusion method of Examples 10–12, and the prills were sintered at 1500° C. for 10 minutes. The density of the sintered prills was 238 Kg/m$^3$.

EXAMPLE 20

Montmorillonite (50 g) was dispersed in de-ionised water (338 g) and 18.3% delaminated vermiculite slurry (137 g) were added to the dispersion, followed by "Forafac" 1157 (3 g). The mixture was whisked in a Kenwood Chef Mixer for 1 hour to produce a stable wet foam. The wet foam was converted into dry prills of cellular structure by the belt-extrusion method of Examples 10–12. The prills, dried at 90° C., had a density of 108 Kg/m$^3$.

EXAMPLE 21

Sodium Montmorillonite (50 g—Wyoming bentonite) and Kaolin clay (50 g) were mixed with de-ionised water (450 g) in a Kenwood Chef Mixer until the Montmorillonite had been thoroughly dispersed. "Forafac" 1157 (6 g) was added and the mixture was whisked for 1 hour at maximum speed to produce a stable wet foam. Prills of dry foam made from the wet foam by belt-extrusion as in Examples 10–12 and then sintered at 1050° C. for 10 minutes had a density of 118 Kg/m$^3$.

EXAMPLE 22

Sodium Montmorillonite (Wyoming bentonite—50 g) and de-ionised water (450 g) were stirred in a Kenwood Chef Mixer until the Montmorillonite was thoroughly dispersed. "Forafac" 1157 (6 g) was added and the mixture was beaten with the whisk attachment at maximum speed setting for about 1 hour to produce a stable wet foam. Prills were made from the wet foam by the belt-extrusion method of Examples 10–12 and sintered at 1000° C. for 10 minutes. The sintered prills had a density of 110 Kg/m$^3$.

EXAMPLE 23

Sodium Montmorillonite (200 g) and a 60% aqueous solution of butylammonium chloride chloride (360 g) and de-ionised water (750 g) were heated at 80° C. with stirring for 4 hours. The resulting butylammonium Montmorillonite (solid) was separated by filtration and washed free of chloride ion. One quarter of the solid was whisked with de-ionised water (120 g) and "Forafac" 1157 (12 g) in a Kenwood Chef Mixer for 1 hour to produce a stable wet foam. The wet foam was transferred to a mould and dried as described in Example 1 to yield a rigid foam of cellular structure.

EXAMPLE 24

Magnesium Montmorillonite was prepared by heating sodium Montmorillonite (Wyoming bentonite—200 g) with magnesium chloride ($MgCl_2.6H_2O$—203 g) in de-ionised water (1 liter) at 80° C. for 4 hours. The magnesium Montmorillonite (solid) was separated by filtration and washed free of chloride ion. One quarter of the solid was whisked with de-ionised water (100 g) and "Forafac" 1157 (0.8 g) in a Kenwood Chef Mixer to produce a stable wet foam. The wet foam was formed into a dry slab as described in Example 1. The dry foam had a cellular structure.

EXAMPLE 25

Aluminium Montmorillonite was prepared by heating sodium Montmorillonite (Wyoming bentonite—200 g) with aluminium nitrate ($Al(NO_3)_3.9H_2O$—375 g) in de-ionised water (1.1 liter) at 80° C. for 4 hours. The aluminium Montmorillonite (solid) was separated by filtration and washed free of nitrate ion. One quarter of the solid was whisked in a Kenwood Chef Mixer with de-ionised water (100 g) and "Forafac" 1157 (0.8 g) to produce a stable wet foam. The wet foam was cast and dried as in Example 1 to yield a dry, rigid foam of cellular structure.

EXAMPLE 26

A board measuring 15 cm×15 cm×2.5 cm was made from approximately spherical, dry prills of delaminated vermiculite foam of diameter 3 mm prepared as described in Examples 10–12. The prills had a true density of 65 Kg/m$^3$ and a packing density of 45 Kg/m$^3$.

The dry prills (22 g) were placed in a steel mould of size 15 cm×15 cm×2.5 cm and a force of 15 Kg/m$^3$ was applied using a steel plate to compress the assembly of prills. Pressure was applied until the volume of the assembly of prills was reduced by about one half. The product was a board of essentially cellular structure and had a density of 90 Kg/m$^3$, a flexural strength of 30 KN/m$^2$ and a compressive strength of 100 KN/m$^2$.

The board was pushed from the mould and its two major faces were coated with a 35% aqueous solution of sodium silicate. Glass fibre scrim of weight 50 g/m$^3$ was pressed onto the coated surfaces and the resulting laminate was dried in an oven for 2 hours. The laminate had a density of 95 Kg/m$^3$, a flexural strength of 300 KN/m$^2$ and a compressive strength of 150 KN/m$^2$. The thermal conductivity of the laminate measured according to BS 874 was 0.056.

EXAMPLE 27

A board measuring 15 cm×15 cm×2.5 cm was prepared as described in Example 26 except that the prills were moistened with de-ionised water (44 g) before being placed in the mould. The resulting board had an essentially cellular structure and its density was 90 Kg/m$^3$. The flexural strength of the board was 60 KN/m$^2$ compressive strength was 110 KN/m$^3$.

The board was laminated with glass fibre scrim as described in Example 26 and the dry laminate had a density of 95 Kg/m$^3$, a flexural strength of 400 KN/m$^2$ and a compressive strength of 130 KN/m$^2$.

EXAMPLE 28

A dry, rigid foam was produced by the procedure described in Example 1 from 50 g of Kaolin clay (light grade), 200 ml of de-ionised water and 0.3 g of "Vantoc" CL (a quaternary ammonium bromide surface active agent available from Imperial Chemical Industries Limited).

The density of the dry foam was 88 Kg/m$^3$.

EXAMPLE 29

A composite board containing dry prills made from vermiculite foam and a matrix of vermiculite foam was made as follows.

Vermiculite foam was generated by beating a 20 wt % suspension of delaminated vermiculite. 250 g of suspension was beaten for 5 minutes using a Kenwood mixer at 60 revolutions/minute. The resulting foam was then mixed with 50 g of prills made from foamed vermiculite and stirred with a large mechanical stirrer at 5 revolutions/minute. The vermiculite prills had a density of 70 Kg/m$^3$, a compressive strength of 100 KN/m$^2$ and a diameter of 3 mm.

The resulting mixture was smoothed into a metal tray measuring 2.5 cm×2.5 cm×2.5 cm, dried at room temperature for 24 hours and then at 50° C. for 2 days. The resulting block had a compressive strength of 200 KN/m$^2$, a flexural strength of 350 KN/m$^2$ and a density of 95 Kg/m$^3$. Thermal conductivity of the board was 0.059 W/mk at 20° C.

EXAMPLE 30

A composite board containing dry beads of expanded perlite and a matrix of vermiculite foam was made as follows.

Vermiculite wet foam was made as described in Example 29. The resulting foam was then mixed with 100 g of beads made from expanded perlite. The beads had a density of 130 Kg/m$^3$, a compressive strength of 250 KN/m$^2$ and a diameter of 2-5 mn.

The resulting block had a compressive strength of 250 KN/m$^2$, a flexural strength of 300 KN/m$^2$ and a density of 110 Kg/m$^3$. Thermal conductivity of the board was 0.046 W/mk at 20° C.

EXAMPLE 31

A composite board containing dry prills made from foamed Kaolin and a matrix of vermiculite foam was made as follows.

Vermiculite foam was generated as described in Example 29. The resulting foam was then mixed with 50 g of prills made of foamed Kaolin. The prills had a density of 65 kg/m$^3$, a compressive strength of 90 KN/m$^2$ and a diameter of 3 mm.

The resulting block had a compressive strength of 110 KN/m$^2$, a flexural strength of 250 KN/m$^2$ and a density of 85 Kg/m$^3$. Thermal conductivity of the block was 0.045 W/mk at 20° C.

We claim:

1. A rigid inorganic foam product consisting essentially of prills of foam of one or more layer minerals, each prill being of cellular structure.

2. A rigid inorganic foam product as claimed in claim 1 having a density of less than 0.4 g/ml.

3. A rigid foam product as claimed in claim 2 having a density of less than 0.2 g/ml.

4. A foam product as claimed in claim 1, 2 or 3 wherein the prills of foam are made of delaminated vermiculite.

5. A foam product as claimed in claim 1, 2 or 3 wherein the prills of foam are made of kaolinite or a kaolin-containing clay.

6. A foam product as claimed in claim 1, 2 or 3 wherein the prills of foam are made of montmorillonite.

7. A foam product as claimed in claim 1, 2 or 3 wherein the prills of foam are made of sepiolite.

8. A foam product as claimed in claim 1 consisting essentially of a mixture of prills of foam of different layer minerals.

9. A foam product as claimed in claim 1 wherein the prills of foam are glued together by means of an adhesive.

10. A foam product as claimed in claim 9 wherein the adhesive is phosphoric acid or a phosphate.

11. A foam product as claimed in claim 9 wherein the adhesive is sodium silicate.

12. A foam product as claimed in claim 9 wherein the adhesive is an organic binder.

13. A foam product as claimed in claim 1 wherein the prills of foam are embedded in a cellular matrix comprising one or more layer minerals.

14. A foam product as claimed in claim 13 wherein the cellular matrix comprises delaminated vermiculite.

15. A rigid inorganic foam of cellular structure consisting essentially of a mixture of layer minerals.

16. A rigid inorganic foam of cellular structure consisting essentially of montmorillonite.

17. A rigid inorganic foam of cellular structure consisting essentially of sepiolite.

18. A rigid inorganic foam of cellular structure consisting essentially of a ball clay and/or a fire clay.

19. A rigid inorganic foam as claimed in claim 15 having a density below 0.4 g/ml.

20. A rigid inorganic foam as claimed in claim 15 consisting essentially of delaminated vermiculite and kaolinite or a kaolin-containing clay.

21. A rigid inorganic foam as claimed in claim 20 consisting essentially of at least 10% by weight of delaminated vermiculite.

22. A rigid inorganic foam as claimed in claim 15 which is in the form of a laminate with one or more layers of a non-foamed material.

23. Rigid inorganic foam prills having a cellular structure and consisting essentially of one or more layer minerals.

24. Rigid inorganic foam prills as claimed in claim 23 consisting essentially of delaminated vermiculite.

25. Rigid inorganic foam prills as claimed in claim 23 consisting essentially of kaolinite or kaolin-containing clay.

26. Rigid inorganic foam prills as claimed in claim 23 consisting essentially of montmorillonite.

27. Rigid inorganic foam prills as claimed in claim 23 consisting essentially of sepiolite.

28. Rigid inorganic foam prills as claimed in claim 23 consisting essentially of vermiculite and kaolinite.

29. Rigid inorganic foam prills as claimed in claim 23 consisting essentially of delaminated vermiculite and kaolinite.

30. Rigid inorganic foam prills as claimed in claim 23 coated with a binding agent or adhesive.

31. Rigid inorganic foam prills as claimed in claim 23 having a density of less than 0.4 g/ml.

32. Rigid inorganic prills as claimed in claim 25 having a density of less than 0.2 g/ml.

33. A suspension of two or more layer minerals in an aqueous solution of a surface active agent.

34. A suspension as claimed in claim 33 wherein one of the layer minerals is delaminated vermiculite.

35. A suspension as claimed in claim 34 of delaminated vermiculite and kaolinite or a kaolin-containing clay.

36. A suspension of one or more layer minerals selected from kaolinite, or a kaolin-containing clay, montmorilloite and sepiolite in an aqueous solution of a surface active agent, wherein the surface active agent is one capable of forming a stable foam from the layer mineral(s).

37. A dry powder comprising two or more layer minerals and a surface active agent.

38. A dry powder comprising kaolinite or a kaolin-containing clay, montmorillonite or sepiolite and a surface active agent.

* * * * *

UNITED STATES PATENT AND TRADEMARK OFFICE
CERTIFICATE OF CORRECTION

PATENT NO. : 4,395,456
DATED : July 26, 1983
INVENTOR(S) : Graham V. Jackson et al.

It is certified that error appears in the above-identified patent and that said Letters Patent is hereby corrected as shown below:

Delete Claims "15 through 19" and "33 through 38".

Claims "20, 21 and 22" should read -- 15, 16 and 17 as follows:

15. A rigid inorganic foam product as claimed in claim 1 wherein the prills consist essentially of delaminated vermiculite and kaolinite or a kaolin-containing clay.
16. A rigid inorganic foam product as claimed in claim 15 wherein the prills contain at least 10% by weight of delaminated vermiculite.
17. A rigid inorganic foam product as claimed in claim 1 wherein the prills are in the form of a laminate with one or more layers of a non-foamed material.

Column 20, Claims "23 through 32" should be renumbered to read -- 18 through 27 --. Claims "19 through 26, claim dependency numeral "23", each occurrence, should read -- 18 --. Claim 27, claim dependency numeral "25" should read -- 20 --.

UNITED STATES PATENT AND TRADEMARK OFFICE
CERTIFICATE OF CORRECTION

PATENT NO. : 4,395,456

DATED : July 26, 1983

INVENTOR(S) : Graham V. Jackson et al.

It is certified that error appears in the above-identified patent and that said Letters Patent is hereby corrected as shown below:

On the title page, "38 Claims, No Drawings" should read -- 27 Claims, No Drawings --.

Signed and Sealed this

Twenty-seventh Day of March 1984

[SEAL]

*Attest:*

*Attesting Officer*

GERALD J. MOSSINGHOFF

*Commissioner of Patents and Trademarks*